United States Patent
Shuster et al.

(10) Patent No.: US 10,248,919 B2
(45) Date of Patent: Apr. 2, 2019

(54) TASK ASSIGNMENT USING MACHINE LEARNING AND INFORMATION RETRIEVAL

(71) Applicant: Red Hat Israel, Ltd., Ra'anana (IL)

(72) Inventors: Boaz Shuster, Ra'anana (IL); Or Moshe Granit, Ra'anana (IL)

(73) Assignee: Red Hat Israel, Ltd., Ra'anana (IL)

( * ) Notice: Subject to any disclaimer, the term of this patent is extended or adjusted under 35 U.S.C. 154(b) by 48 days.

(21) Appl. No.: 15/272,123

(22) Filed: Sep. 21, 2016

(65) Prior Publication Data

US 2018/0081683 A1 Mar. 22, 2018

(51) Int. Cl.
*G06F 9/44* (2018.01)
*G06F 11/36* (2006.01)
(Continued)

(52) U.S. Cl.
CPC ....... *G06Q 10/06311* (2013.01); *G06Q 10/10* (2013.01); *G06F 8/37* (2013.01);
(Continued)

(58) Field of Classification Search
CPC ..... G06F 8/37; G06F 8/73; G06F 8/75; G06F 8/10; G06F 8/71; G06F 8/20; G06F 9/444;
(Continued)

(56) References Cited

U.S. PATENT DOCUMENTS

| | | | | |
|---|---|---|---|---|
| 7,539,943 B2 * | 5/2009 | Vaidyanathan | ......... | G06F 9/451 715/744 |
| 8,549,359 B2 * | 10/2013 | Zheng | ................. | G06F 11/362 714/38.11 |

(Continued)

FOREIGN PATENT DOCUMENTS

| | | |
|---|---|---|
| CN | 102226913 A | 10/2011 |
| CN | 101727533 B | 6/2014 |

OTHER PUBLICATIONS

Tao Zhang et al., An Automated Bug Triage Approach: A Concept Profile and Social Network Based Developer Recommendation, 2012, [Retrieved on Jan. 4, 2018]. Retrieved from the internet: <URL: https://link.springer.com/content/pdf/10.1007/978-3-642-31588-6_65.pdf> 8 Pages (505-512).*

(Continued)

*Primary Examiner* — Anibal Rivera
(74) *Attorney, Agent, or Firm* — Hyanes and Boone, LLP

(57) ABSTRACT

An example method of assigning a task to a developer includes partitioning, based on a first set of developer attributes, a list of developers into a plurality of developer clusters. The method also includes for a plurality of tasks, identifying a set of developers assigned to the respective task, identifying a developer cluster including a greater number of developers from the respective set of developers than another developer cluster, and classifying the respective task as belonging to the respective developer cluster. The method further includes comparing attributes of classified tasks to a second set of attributes of a new task and selecting a classified task having a greater number of attributes that match the second set of attributes than another classified task, the classified task belonging to a first developer cluster. The method further includes assigning the new task to one or more developers included in the first developer cluster.

20 Claims, 5 Drawing Sheets

(51) Int. Cl.
*G06F 17/30* (2006.01)
*G06Q 10/06* (2012.01)
*G06Q 10/10* (2012.01)
G06F 8/30 (2018.01)
G06F 8/71 (2018.01)

(52) U.S. Cl.
CPC .............. *G06F 8/71* (2013.01); *G06F 11/366* (2013.01); *G06Q 10/06313* (2013.01)

(58) Field of Classification Search
CPC ........ G06F 9/445; G06F 11/366; G06F 11/36; G06F 11/3616; G06F 11/3664; G06F 11/3692; G06F 8/30; G06F 8/77; G06F 8/436; G06F 11/3612; G06F 17/30106; G06F 17/30616; G06Q 10/00; G06Q 10/06; G06Q 10/10; G06Q 10/101; G06Q 10/0633; G06Q 10/063112; G06Q 10/063; G06Q 10/06311; G06Q 10/06313
See application file for complete search history.

(56) References Cited

U.S. PATENT DOCUMENTS

| | | | | |
|---|---|---|---|---|
| 9,262,157 | B2* | 2/2016 | Henriksen | G06F 17/30106 |
| 9,298,453 | B2* | 3/2016 | Vangala | G06F 8/75 |
| 9,305,279 | B1* | 4/2016 | Menzel | G06F 8/75 |
| 9,626,283 | B1* | 4/2017 | Zlatnik | G06Q 10/06 |
| 2003/0182173 | A1* | 9/2003 | D'Elena | G06Q 10/06 705/7.14 |
| 2003/0182178 | A1* | 9/2003 | D'Elena | G06Q 10/063112 705/7.14 |
| 2006/0123389 | A1* | 6/2006 | Kolawa | G06F 11/3616 717/101 |
| 2006/0173879 | A1* | 8/2006 | MacFarlane | G06Q 10/10 |
| 2007/0250816 | A1* | 10/2007 | Rose | G06Q 10/06 717/124 |
| 2009/0192884 | A1* | 7/2009 | Lo | G06Q 10/06312 705/7.22 |
| 2009/0210853 | A1* | 8/2009 | Kumar | G06F 8/10 717/101 |
| 2010/0131450 | A1* | 5/2010 | Nguyen | G06N 5/022 706/54 |
| 2010/0191731 | A1* | 7/2010 | Rus | G06F 17/3071 707/737 |
| 2011/0252394 | A1* | 10/2011 | Sharma | G06F 11/3616 717/101 |
| 2012/0197809 | A1* | 8/2012 | Earl | G06Q 10/103 705/301 |
| 2013/0325763 | A1* | 12/2013 | Cantor | G06Q 10/0633 706/12 |
| 2014/0089027 | A1* | 3/2014 | Brown | G06Q 10/06311 705/7.15 |
| 2014/0114980 | A1* | 4/2014 | Mani | G06F 17/30616 707/741 |
| 2014/0165027 | A1* | 6/2014 | Herbert | G06Q 10/063112 717/101 |
| 2014/0288983 | A1* | 9/2014 | Winnie | G06Q 10/06311 705/7.14 |
| 2014/0369597 | A1* | 12/2014 | Shulman | G06K 9/6254 382/159 |
| 2015/0081363 | A1* | 3/2015 | Taylor | G06Q 10/06 705/7.14 |
| 2015/0142716 | A1* | 5/2015 | Lucey | G06N 5/022 706/46 |
| 2015/0170081 | A1* | 6/2015 | Bothello | G06Q 10/06313 705/7.15 |
| 2015/0262077 | A1* | 9/2015 | White | G06N 99/005 706/12 |
| 2015/0309790 | A1* | 10/2015 | Henriksen | G06F 17/30106 717/121 |
| 2015/0355998 | A1* | 12/2015 | Kogan-Katz | G06F 11/366 717/101 |
| 2015/0363196 | A1* | 12/2015 | Carback, III | G06F 8/37 717/123 |
| 2016/0004517 | A1* | 1/2016 | Safary | G06F 8/436 717/131 |
| 2016/0048805 | A1* | 2/2016 | Blincoe | G06Q 10/101 717/102 |
| 2016/0092769 | A1* | 3/2016 | Lucey | G06K 9/00724 706/47 |
| 2016/0162289 | A1* | 6/2016 | Henriksen | G06F 11/3604 717/123 |
| 2016/0216964 | A1* | 7/2016 | Balasubramanian | G06F 8/30 |
| 2016/0224908 | A1* | 8/2016 | Jagannathan | G06Q 10/063 |
| 2016/0321034 | A1* | 11/2016 | Yen | G06F 8/20 |
| 2016/0357660 | A1* | 12/2016 | Dean | G06F 11/3692 |
| 2017/0060732 | A1* | 3/2017 | Golfieri | G06F 11/3664 |
| 2017/0123790 | A1* | 5/2017 | Gupta | G06F 11/3604 |

OTHER PUBLICATIONS

Tao Zhang et al., A Hybrid Bug Triage Algorithm for Developer Recommendation, Mar. 18-22, 2013 , [Retrieved on Oct. 2, 2018]. Retrieved from the internet: <URL: https://dl.acm.org/citation.cfm?id=2480568> 7 Pages (1088-1094) (Year: 2013).*

Mainur Rahman et al., Optimized Assignment of Developers for Fixing Bugs an Initial Evaluation for Eclipse Projects, 2009 IEEE, [Retrieved on Oct. 2, 2018]. Retrieved from the internet: <URL: https://ieeexplore.ieee.org/stamp/stamp.jsp?tp=&arnumber=5316025> 4 Pages (439-442) (Year: 2009).*

Ramin Shokripour, Zarinah M. Kasirun, Sima Zamani, John Anvik, *Automatic Bug Assignment Using Information Extraction Methods*, Faculty of Computer Science & Information Technology, University of Malaya, Kuala Lumpur, Malaysia ; Department of Computer science Central Washington University Ellensburg, Washington, United States of America, https://umexpert.um.edu.my/file/publication/00001336_88350.pdf.

Leif Jonsson, Markus Borg, David Broman, Kristian Sandahl, Sigrid Eldh, Per Runeson, *Automated Bug Assignment: Ensemble-based Machine Learning in Large Scale Industrial Contexts*, Jan. 1, 2015, Ericsson and Department of Computer and Information Science Linkoping University Torshamnsgatan 42, SE-16480, Stockholm, Sweden; Department of Computer Science, Lund University; University of California, Berkeley; Department of Computer and Information Science Linkoping University; Ericsson AB. https://www.google.co.in/url?sa=t&rct=j&q=&esrc=s&source=web&cd=7&ved=0ahUKEwiX3syw-Z_OAhWluo8KHR2zA88QFghKMAY&url=http%3A%2F%2Flup.lub.lu.se%2Frecord%2F7865961%2Ffile%2F7865979.pdf&usg=AFQjCNFuVEwykybYPIL42UHJfxLaIEPnZA&sig2=UrZIAaybMKpkl24W5hoRhA&bvm=bv.128617741,d.c2I&cad=rja.

Syed Nadeem Ahsan, Javed Ferzund, Franz Wotawa, *Program File Bug Fix Effort Estimation Using Machine Learning Methods for Open Source Software Projects*, Apr. 24, 2009, Institute for Software Technologies, Technische University at Graz, Inffeldgasse 16b/2, A-8010 Graz, Austria. https://online.tugraz.at/tug_online/voe_main2.getVollText?pDocumentNr=100089&pCurrPk=43339.

Edwin Simpson, Stephen Roberts, *Bayesian Methods for Intelligent Task Assignment in Crowdsourcing Systems*, Feb. 10, 2015, Machine Learning Research Group, University of Oxford, Oxford, UK. http://link.springer.com/chapter/10.1007/978-3-319-15144-1_1.

* cited by examiner

TASK ASSIGNMENT USING MACHINE LEARNING AND INFORMATION RETRIEVAL

FIELD OF DISCLOSURE

The present disclosure generally relates to electrical computers and more particularly to assigning tasks to a user.

BACKGROUND

Companies often handle large projects involving multiple employees. Task management software exists that allows companies to keep track of projects and follow up on assigned tasks. To efficiently manage a project, the project may be broken down into multiple tasks, and each task may be assigned to a group of employees for handling.

It is important for team leaders to assess the scope and feasibility of a project and the strength of each team member. From this information, leaders may assign roles and responsibilities to team members. The assignment of such responsibilities to particular team members may improve the project in terms of operating costs, morale, efficiency, and time.

If responsibilities are not assigned, the outcome of a task may become unclear, vague and often incomplete. The assignment of roles and responsibilities also enables team members to bet a better idea of which members are working on closely related tasks. Members can review the to-do list, see which member is completing the assignment and issue follow-up feedback and questions if necessary. Essentially, delegating tasks allows for the creation of a project blueprint.

BRIEF SUMMARY

Methods, system, and techniques for assigning a task to a developer are provided.

An example method of assigning a task to a developer includes partitioning a list of developers into a plurality of developer clusters. A developer is included in a developer cluster based on a first set of attributes indicative of the developer's experience with software development. The method also includes for a plurality of tasks, identifying a set of developers assigned to the respective task, identifying a developer cluster including a greater number of developers from the respective set of developers than another developer cluster, and classifying the respective task as belonging to the respective developer cluster. The method further includes comparing one or more attributes of one or more classified tasks to a second set of attributes of a new task. The method also includes selecting a classified task having a greater number of attributes that match the second set of attributes than another classified task. The classified task belongs to a first developer cluster. The method further includes assigning the new task to one or more developers included in the first developer cluster.

An example system for assigning a task to a developer includes a developer partitioning module that partitions a list of developers into a plurality of developer clusters. A developer is included in a developer cluster based on a first set of attributes indicative of the developer's experience with software development. The system also includes a task classification module that for a plurality of tasks, identifies a set of developers assigned to the respective task, identifies a developer cluster including a greater number of developers from the respective set of developers than another developer cluster, and classifies the respective task as belonging to the respective developer cluster. The system also includes an assignment module that compares one or more attributes of one or more classified tasks to a second set of attributes of a new task, selects a classified task having a greater number of attributes that match the second set of attributes than another classified task, and assigns the new task to one or more developers included in the first developer cluster. The classified task belongs to the first developer cluster.

An example machine-readable medium includes a plurality of machine-readable instructions that when executed by one or more processors is adapted to cause the one or more processors to perform a method including: partitioning a list of developers into a plurality of developer clusters, a developer being included in a developer cluster based on a first set of attributes indicative of the developer's experience with software development; for a plurality of tasks: identifying a set of developers assigned to the respective task, identifying a developer cluster including a greater number of developers from the respective set of developers than another developer cluster, and classifying the respective task as belonging to the respective developer cluster; comparing one or more attributes of one or more classified tasks to a second set of attributes of a new task; selecting a classified task having a greater number of attributes that match the second set of attributes than another classified task, the classified task belonging to a first developer cluster; and assigning the new task to one or more developers included in the first developer cluster.

Figure 1:
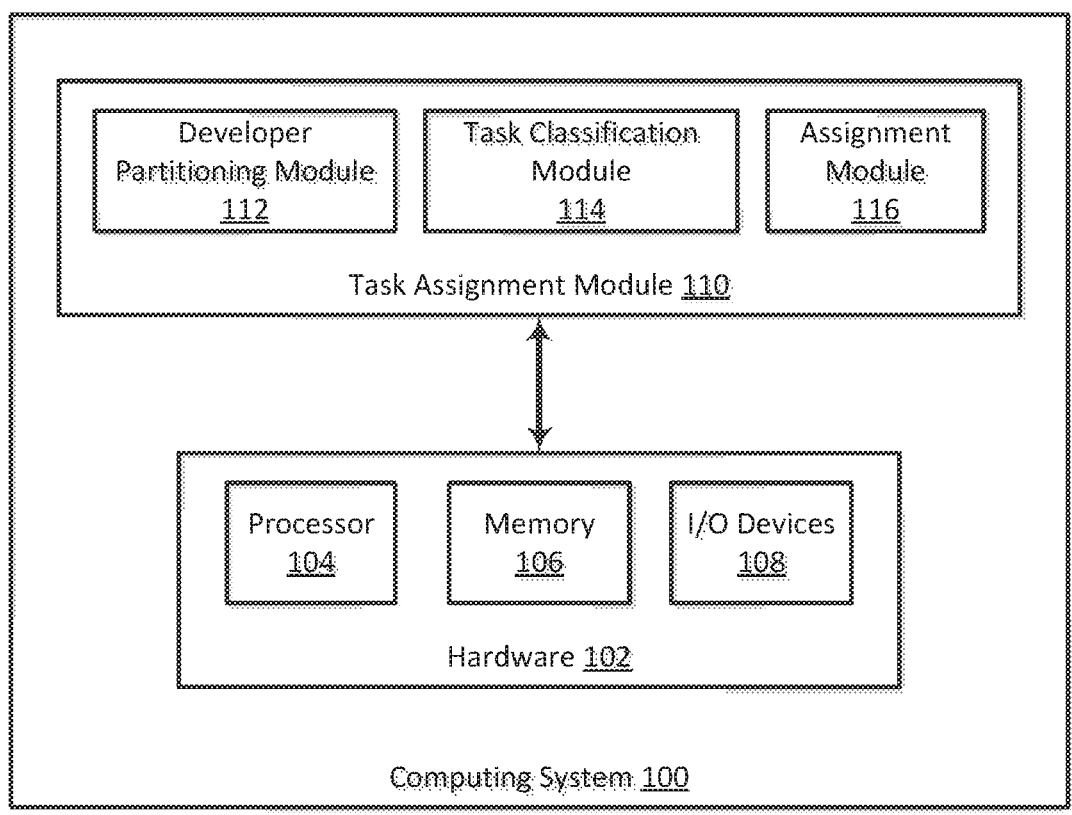
FIG. 1 is a block diagram illustrating an example computing system for assigning a new task to a developer, in accordance with various examples of the present disclosure.

Examples of the present disclosure and their advantages are best understood by referring to the detailed description that follows.

DETAILED DESCRIPTION

In the following description, specific details are set forth describing some examples consistent with the present disclosure. It will be apparent, however, to one skilled in the art that some examples may be practiced without some or all of these specific details. The specific examples disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one example may be incorporated into other examples unless specifically described otherwise or if the one or more features would make an example non-functional.

A company may be involved in software projects. One of the tedious tasks in the software development life-cycle is to assign a task to a developer, because it is time-consuming and also requires a level of familiarity with the project that the assigner may not always possess. For example, big open source projects may have many different contributors and components, making task assignment particularly difficult in terms of efficiency and selecting a qualified person to complete the task. It may be desirable for the person assigning tasks to developers to interact or work with that particular team or project for many years to understand what the company does and others' responsibilities. A lot of time may be wasted on determining the right person for completing a particular task because the person making the assignment takes time to familiarize herself with the system and project.

Companies that develop software may have efficiency issues with assigning a software bug to a developer to fix. A software bug is an error, flaw, failure or fault in a computer program or system that causes it to produce an incorrect or unexpected result, or to behave in unintended ways. Software bugs may arise from mistakes and errors made in either a program's source code or its design, or in components and operating systems used by such programs. A few are caused by compilers producing incorrect code. Identifying and fixing software bugs may be tedious work. Currently, in bug tracking systems like JIRA® and Bugzilla, when a new bug is reported, it is eventually assigned to a developer to fix.

Assignment of tasks to qualified persons proves to be a challenge for organizations and groups. For example, an "assigner" may research projects and developers to determine which developers are responsible for which offerings, have worked on particular projects, etc. It may be desirable for the person assigning tasks to developers to be working in that particular team or project for many years to understand what the company does and others' responsibilities. Accordingly, it may be cumbersome to identify the most qualified persons for completing tasks.

After the review process, the assigner assigns the new task to a developer. The developer may be someone to whom the assigner frequently assigns tasks. Even so, the developer may be unable to complete the task and may forward it on to another developer to complete. This task forwarding may occur frequently, and without the assigner's knowledge.

These problems may be solved by using machine learning and information retrieval to identify qualified developers having experience with tasks similar to the one being assigned. The present disclosure provides techniques to assign (e.g., automatically or with user interaction) or recommend a group of developers qualified to complete this task to the assigner. An advantage of the disclosure may minimize the time spent on task assignments and may provide a better prediction regarding qualified developers who may have a better chance at completing the particular task compared to other developers. The prediction may be based on the developers' experiences. Of course, it is understood that these features and advantages are shared among the various examples herein and that no one feature or advantage is required for any particular example.

The present disclosure provides techniques for assigning a software bug to a developer. Unless specifically stated otherwise, as apparent from the following discussion, it is appreciated that throughout the description, discussions utilizing terms such as "determining," "storing," "retrieving," "receiving," "sending," "extracting," "sending," "identifying," "partitioning," "classifying," "selecting," "assigning," "displaying," "comparing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

FIG. 1 is a block diagram illustrating an example computing system 100 for assigning a new task to a developer, in accordance with various examples of the present disclosure. Computing system 100 may include a personal computer (PC), tablet PC, rack mount computer, cellular telephone, web appliance, server, or any machine capable of executing a set of instructions (sequential or otherwise) that specify actions to be taken by that machine. Further, while a single computing system is illustrated, it should be understood that any collection of computing systems may individually or jointly execute a set (or multiple sets) of instructions to perform any one or more of the methodologies discussed herein. For example, a collection of computing systems may be communicatively coupled via one or more network devices and/or transport media.

Computing system 100 includes hardware 102. Hardware 102 includes physical elements such as a processor 104, a memory 106, and an input/output (I/O) device 108. While one of each of these elements is illustrated for the purposes of simplicity, in some examples more than one of these hardware elements may be included. For example, hardware 102 may include a plurality of processors as well as various types of memory and host devices.

A "processor" may also be referred to as a "physical processor" or "central processing unit (CPU)" herein. A processor shall refer to a device capable of executing instructions encoding arithmetic, logical, or I/O operations. In one illustrative example, a processor may follow the Von Neumann architectural model and may include an arithmetic logic unit (ALU), a control unit, and a plurality of registers. In a further aspect, a processor may be a single core processor that is typically capable of executing one instruction at a time (or process a single pipeline of instructions), or a multi-core processor that may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket).

In the present example, processor 104 is structured to include one or more general-purpose processing devices such as a microprocessor, central processing unit, and the like. More particularly, processor 104 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some examples, processor 104 is structured to include one or more special-purpose processing devices such as an application specific integrated circuit (ASIC), a field programmable gate array (FPGA), a digital signal processor (DSP), network processor, and so forth. Processor 104 executes instructions for performing the operations, steps, and actions discussed herein.

"Memory" herein shall refer to volatile or non-volatile memory, such as random access memory (RAM), read-only memory (ROM), electrically erasable ROM (EEPROM), or any other memory capable of storing data. In the present example, memory 106 is structured to include at least one computer-readable storage medium on which is stored one or more sets of instructions (e.g., software) embodying any one or more of the methodologies or functions described herein. Memory 106 may be structured to include one or more of a read-only memory (ROM), flash memory, dynamic random access memory (DRAM) such as synchronous DRAM (SDRAM), double data rate (DDR SDRAM), or DRAM (RDRAM), and so forth), static memory (e.g., flash memory, static random access memory (SRAM), and so forth), and a data storage device (e.g., a hard disk drive (HDD), solid state drive (SSD), and so forth). Accordingly, any of the operations, steps, and actions of the methods described herein may be implemented using corresponding machine-readable instructions stored on or in a non-transitory computer-readable medium that are executable by processor 104.

In the present example, I/O device 108 is structured to include at least one hardware device, such as a network interface card, wireless adapter card, audio/sound card, graphics card, storage adapter, or other hardware device. In some examples, these hardware devices are coupled to a PCI bus provided by hardware 102. In other examples, hardware devices are integrated into a motherboard provided by hardware 102. Hardware 102 also may include other I/O devices 108, such as a video display unit (e.g., a liquid crystal display (LCD) monitor), alphanumeric input device (e.g., a keyboard), cursor control device (e.g., a mouse), signal generation device (e.g., a speaker), and so forth. Processor 104, memory 106, and I/O device 108 of the hardware 102 may be communicatively coupled via one or more buses.

Computer system 100 may be coupled over a network to one or more computing devices (not shown). The network may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing.

Computer system 100 includes a task assignment module 110 that assigns tasks to developers. In an example, task assignment module 110 receives a request to assign tasks to one or more developers and may use machine learning and information retrieval to do so. Task assignment module 110 includes a developer partitioning module 112, task classification module 114, and assignment module 116. Developer partitioning module 112 partitions a list of developers into a plurality of developer clusters. Developers included in the same developer cluster may have the same or similar attributes as each other.

Developer partitioning module 112 may use various techniques to partition the list of developers into the appropriate developer cluster based on similarity. In an example, the developers placed into the same developer cluster have a similarity score that exceeds a threshold. In some examples, developer partitioning module 112 uses a K-means clustering formula to partition developers specified in the list of developers into developer clusters. K-means clustering is a similarity technique that when given a data-set of items (e.g., list of developers) and K (desired number of clusters), K-clusters of items are output. Developer partitioning module 112 creates K developer clusters, where each developer cluster includes one or more developers from the list of developers, and where K is a number greater than one. In an example, an administrator may provide K as an input. In another example, K is a default number.

Developer partitioning module 112 may model the data-set of items by a set of attributes. The set of attributes may be used to differentiate the developers and their experience in completing tasks. Developer partitioning module 112 may use a developer's set of attributes to determine in which developer cluster to place the developer. In an example, developer partitioning module 112 uses K-means clustering to partition the list of developers into developer clusters based on a set of attributes. For example, an administrator may provide the set of attributes to developer partitioning module 112 to perform the K-means clustering and accordingly partition the list of developers based on their attributes.

In some examples, the set of attributes is indicative of a developer's experience with software development. Developers placed into the same developer cluster may have similar software development experiences (e.g., worked on the same project, same years of experience, etc.). In an example, the set of attributes may include a developer's past git-commits, review of git-commits, number of git-commits or reviews, years of experience (e.g., number of years the developer has been with the company or has been involved with a specific file, project, or component), number of prior assigned tasks, tags of prior tasks or tickets, and/or description of prior assigned tasks. A new task may refer to a task that has not yet been assigned to a developer. A prior task may refer to a task that has been assigned to a developer. The prior task may or may not have been completed before the request to assign a new task to a developer is received.

Git is a version control system that is used for software development and other version control tasks. Using Git, a developer may compose and save snapshots of projects, and work with and compare those snapshots. Git has an index that acts as a staging area for snapshots, thus allowing developers to build up a series of well composed snapshots from changed files in the working directory, rather than having to commit all of the file changes at once. A developer may change the software code of a program and commit snapshots of those changes into a Git repository each time the project reaches a state the developer would like to record. In an example, the attributes associated with a developer may include the developer's git-commits and review of git-commits. In an example, an attribute of the developer is includes the developer's comments associated with a git-commit, and developer partitioning module 112 partitions the list of developers into the plurality of developer clusters by comparing a description of the developer's comments associated with the git-commit to other developer's descriptions of a git-commit. In this example, if the number of matching keywords in the description satisfies a threshold, the developers have a higher likelihood of being included in the same developer cluster. In another example, the attributes associated with a developer include a description of a prior task, which may include keywords associated with the task. For example, the attributes associated with a developer may indicate which files were changed by the developer.

In some examples, a task is to fix a software bug. In this example, a description of the task may include the name of the software bug along with notes written by one or more developers to which the software bug was assigned. Developer partitioning module 112 may analyze the descriptions of tasks and determine attributes of the tasks. Developer partitioning module 112 may obtain the attribute information in a variety of ways. In an example, developer partitioning module 112 extracts the developers' information from a repository. A developer may write a script that communicates with files storing information about developers and tasks. The script may extract specific task attributes (e.g., number of git-commits written by one or more developers, etc.) from the repository to learn about the developers. Developer partitioning module 112 may obtain information from the repository to get a better idea of what the developers have been and are currently working on.

A developer's attributes may dynamically change. For example, as developers mature and are assigned additional tasks, they may be associated with more git-commits, work another year at the organization, be assigned more tasks, move into a different department, etc. To keep the developer clusters up-to-date, developer partitioning module 112 may periodically analyze developers and their associated attributes to move them into more appropriate developer clusters, if applicable. For example, developer partitioning module 112 may remove a developer from a first developer cluster and place the developer into a second developer cluster different from the first developer cluster. In this example, the developer's attribute may have matched those attributes of developers included in the first developer cluster at a particular point in time, but may now match more closely with those attributes of developers included in the second developer cluster.

Task classification module 114 analyzes tasks (e.g., software bugs) and classifies them as belonging to a particular developer cluster. In an example, for a plurality of tasks, task classification module 114 identifies a set of developers assigned to the respective task, identifies a developer cluster including a greater number of developers from the respective set of developers than another developer cluster, and classifies the respective task as belonging to the identified developer cluster. In an example, the identified developer cluster may include the greatest number of developers from the respective set of developers compared to each other developer cluster of the plurality of developer clusters. The developer cluster to which a task belongs may include developers that are most familiar with the task. A classified task may refer to a task that has been classified as belonging to a particular developer cluster. Although two developer clusters may include developers that worked on completing the task, it may be desirable to classify the task as belonging to a single developer cluster including the greatest number of developers that worked on completing the task. Doing so may narrow down the list of qualified developers associated with a new task assignment.

A new task may arrive in the system and an administrator may be requested to assign the new task to a developer. Assignment module 116 may find a set of classified tasks that is most similar to the new task in order to identify the developers who have previously worked on tasks similar to the new task. The relationship between developers and tasks may be learned by task assignment module 110 in order to assign new tasks to the most qualified developer(s). Assignment module 116 may identify qualified developers that are included in developer clusters to which the set of classified tasks belong, and assign the new task to one or more of these qualified developers.

Assignment module 116 may find the set of classified tasks that is most similar to the new task in a variety of ways. In an example, assignment module 116 uses the K nearest neighbors (KNN) formula to find the set of classified tasks that is most similar to the new task. KNN may store information on classified tasks and determine which tasks are most similar to the new task, based on a similarity measure (e.g., distance functions). A task is classified by a majority vote of its neighbors, with the task being assigned to the class most common amongst its K nearest neighbors measured by a distance function. If K=1, then the case is simply assigned to the class of its nearest neighbor.

In an example, assignment module 116 compares one or more attributes of one or more classified tasks to a second set of attributes of a new task. Assignment module 116 may select a classified task having a greater number of attributes that matches the second set of attributes of the new task than another classified task. In an example, assignment module 116 selects the classified task having the greatest number of attribute matches to the second set of attributes of the new task. In this example, the selected classified task is the one most similar to the new task, in terms of attribute matches.

If the task is to fix a software bug, a script may be written to communicate with the software bug and query it for attribute information (e.g., name of the software bug, description of the software bug, etc.). In an example, an attribute of a software bug includes a description of the software bug, logs, tags, etc. for one or more keywords. The attributes of the new task may be compared with one or more attributes of one or more classified tasks to determine which classified tasks have more attributes that match with the new task than others. The classified tasks having the greatest number of matching attributes are the most similar to the new task and may be selected by assignment module 116. In an example, an attribute of the second set of attributes of a new task is a description of the new task, and assignment module 116 compares one or more attributes of one or more classified tasks to the second set of attributes of the new task by comparing a description of a classified task to the description of the new task for one or more keywords. In this example, if the number of keywords satisfies a threshold, the attribute of the respective classified task matches the corresponding attribute of the new task.

By finding the set of classified tasks that is most similar to the new task, assignment module 116 is able to identify one or more developer clusters to which each of the set of classified tasks belongs. These developer clusters are of interest because they specify developers that have been assigned prior tasks that are similar to the new task. A developer who was previously responsible for a prior task similar to the new task may have an added advantage for solving the new task over other developers because the developer may be familiar with steps taken to successfully complete the new task compared to other developers. Accordingly, this developer may complete the task more efficiently than other developers. By assigning the new task to this developer, the new task may be solved more quickly and efficiently.

The selected classified task belongs to a developer cluster that includes developers having familiarity with tasks similar to the new task, and assignment module 116 assigns the new task to one or more developers included in the developer cluster. Assignment module 116 may assign the new task to developers included in different developer clusters as well. For example, assignment module 116 may select a first classified task and a second classified task, each of these classified tasks having a greater number of attributes that match the second set of attributes of the new task than another classified task. The first classified task may belong to a first developer cluster, and the second classified task may belong to a second developer cluster. In this example, assignment module 116 may assign the new task to one or more developers included in the first developer cluster and also assign the new task to one or more developers included in the second developer cluster.

In an example, assignment module 116 assigns the new task to the developer, without user intervention. In another example, assignment module 116 provides a user with a list of qualified developers, where the list of qualified developers includes developers included in the developer clusters to which the classified tasks most similar to the new task belong. In this example, the user may select at least one of these developers from the list of qualified developers. In this way, developers included in the list of qualified developers may be included based on their experience with handling similar tasks. The assignment of the task to one of these developers may minimize the time spent on determining to whom to assign the tasks along with the time spent on completing the task.

In some examples, the user specifies a number of developer clusters from which to select. For example, the user may specify that up to N developer clusters to which the classified tasks most similar to the new task belong should be selected, where N is a number greater than one. In some examples, the user specifies a preference for one developer cluster over another developer cluster. In this example, if a classified set of tasks belongs to a first developer cluster and a second developer cluster, assignment module 116 may determine which one is preferred by the user and provide the user with the list of developers from the preferred developer cluster, without taking into consideration the developers included in the other developer cluster.

Figure 2:
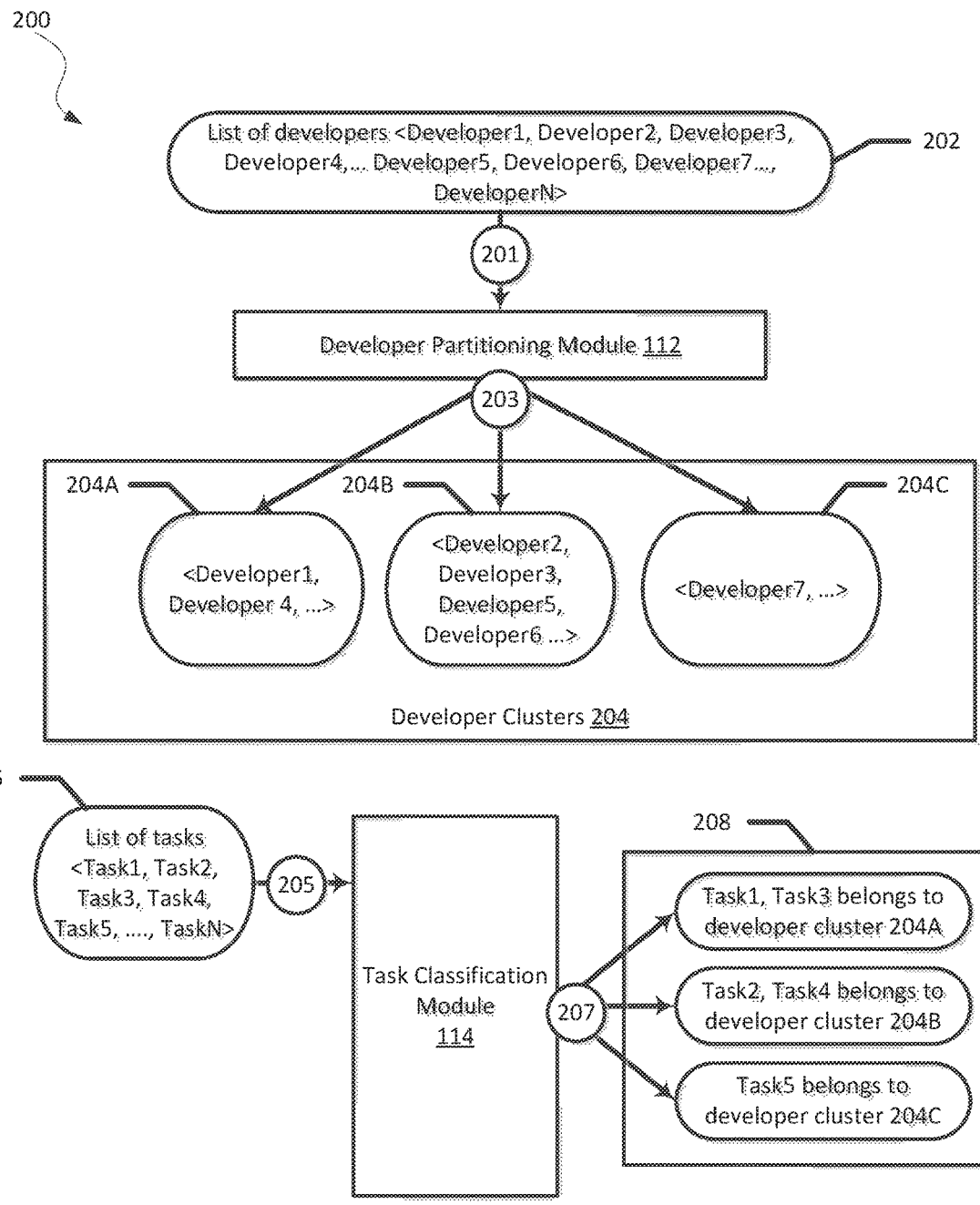
FIG. 2 is a diagram illustrating an example process flow for classifying tasks as belonging to particular developer clusters.

FIG. 2 is a diagram illustrating an example process flow 200 for classifying tasks as belonging to particular developer clusters. Method 200 is not meant to be limiting and may be used in other applications.

At action 201, developer partitioning module 112 obtains a list of developers 202, where the list includes developer1, developer2, developer3, developer4, developer5, developer6, developer7, . . . , developerN. At action 203, developer partitioning module 112 partitions list of developers 202 into a plurality of developer clusters 204. Plurality of developer clusters 204 includes developer cluster 204A, developer cluster 204B, and developer cluster 204C. This is not intended to be limiting, and plurality of developer clusters 204 may include fewer than or more than three developer clusters. Developer cluster 204A includes developer1 and developer4, developer cluster 204B includes developer2, developer3, developer5, and developer6, and developer cluster 204C includes developer7. In an example, developer partitioning module 112 includes a developer in a particular developer cluster based on a first set of attributes indicative of the developer's experience with software development. In an example, the first set of attributes includes the respective developer's git-comments, review of git-commits, or another attribute that may distinguish the developer's software experience from other developers.

At action 205, task classification module 114 receives a plurality of tasks 206, where the plurality of tasks includes Task1, Task2, Task3, Task4, Task5, . . . , TaskN. At action 207, for each task of plurality of tasks 206, task classification module 114 identifies a set of developers assigned to the respective task, identifies a developer cluster including a greater number of developers from the respective set of developers than another developer cluster, and classifies the respective task as belonging to the developer cluster. For example, Task2 may be assigned to developer2, developer3, developer5, and developer7. Task classification module 114 may identify these four developers as being the ones to whom Task2 is assigned, identify developer cluster 204B as including a greater number of developers {developer2, developer3, and developer5} from the respective set of developers {developer2, developer3, developer5, and developer7} than any of the other developer clusters 204, and classify Task2 as belonging to developer cluster 204B. With regard to Task5, task classification module 114 may identify developer7 as being the one to whom Task5 is assigned, identify developer cluster 204C as including a greater number of developers from the respective set of developers {developer7} than any of the other developer clusters 204, and classify Task5 as belonging to developer cluster 204C. Task classification module 114 may perform this analysis for each of the tasks included in plurality of tasks 206. In FIG. 2, task classification module 114 has classified Task1 and Task3 as belonging to developer cluster 204A, classified Task2 and Task4 as belonging to developer cluster 204B, and classified Task5 as belonging to developer cluster 204C.

It is understood that additional processes may be performed before, during, or after actions 201, 203, 205, and/or 207 discussed above. It is also understood that one or more of the actions of process flow 200 described herein may be omitted, combined, or performed in a different sequence as desired.

Figure 3:
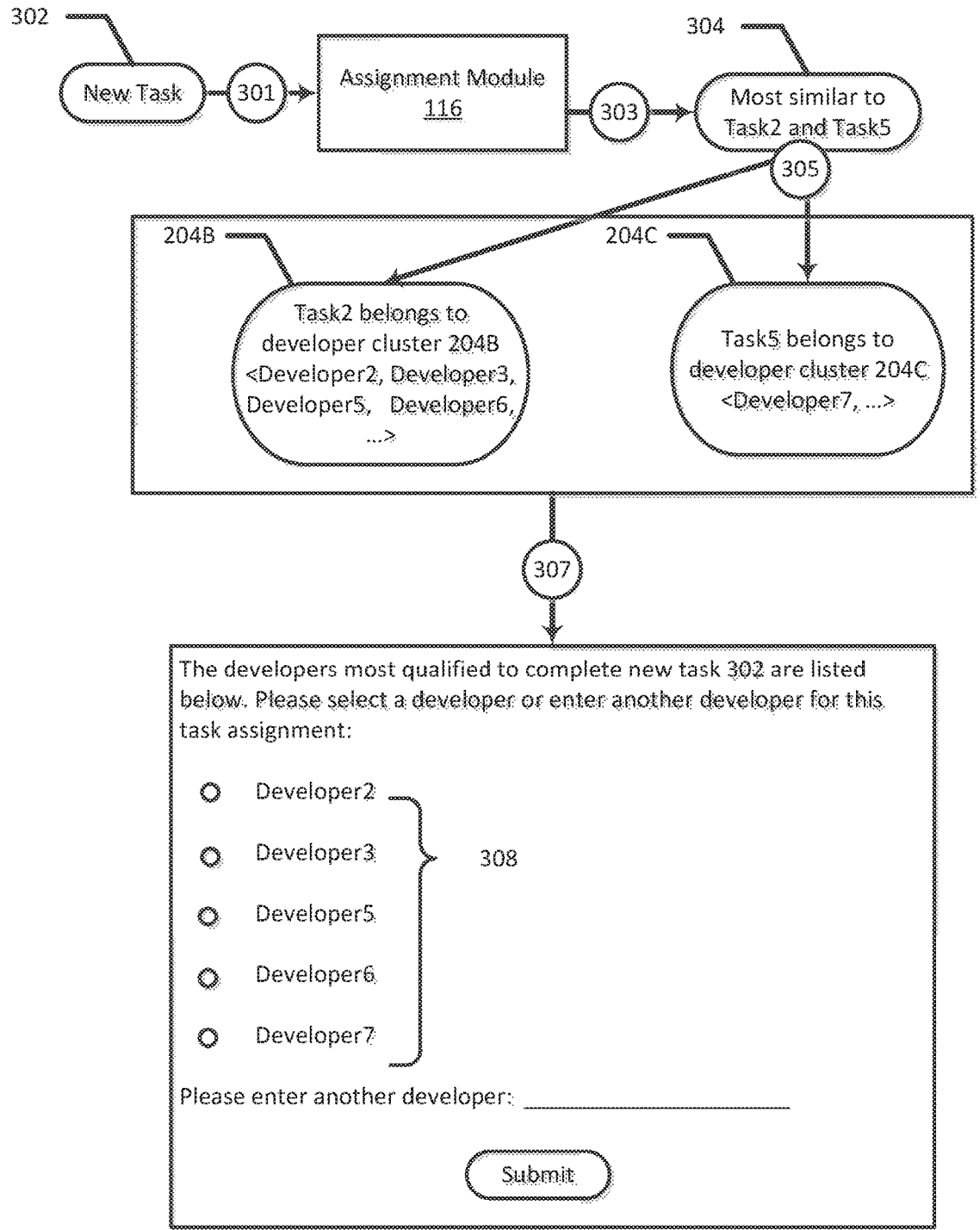
FIG. 3 is a diagram illustrating an example process flow for providing to a user a list of qualified developers having a degree of familiarity with the new task.

FIG. 3 is a diagram illustrating an example process flow 300 for providing a list of qualified developers having a degree of familiarity with a new task to a user. Method 300 is not meant to be limiting and may be used in other applications.

At action 301, assignment module 116 receives a new task 302. In an example, assignment module 116 receives a request to assign new task 302 to one or more developers. At action 303, assignment module 116 identifies task(s) of plurality of tasks 206 that are the most similar to new task 302. In an example, assignment module 116 uses the KNN formula to determine that Task2 and Task5 are the most similar to new task 302. Each of Task2 and Task5 may have one or more attributes that match attributes of new task 302. Assignment module 116 may compare one or more attributes of one or more classified tasks of plurality of tasks 206 to a second set of attributes of new task 302, and determine which classified tasks have a greater number of attributes that match the second set of attributes of new task 302 than another classified task. A first attribute matches a second attribute if they both have the same value. Assignment module 116 may select a classified task having a greater number of attributes that match the second set of attributes than another classified task. In an example, assignment module 116 selects the classified task having the greatest number of attributes that match the second set of attributes of new task 302 compared to the other classified tasks.

At action 305, assignment module 116 determines to which developer cluster the task(s) most similar to new task 302 belong(s). Task2 belongs to developer cluster 204B, which includes developer2, developer3, developer5, and developer6, and Task5 belongs to developer cluster 204C, which includes developer7.

At action 307, assignment module 116 displays a list of qualified developers 308 on a screen coupled to computing device 100, the list of qualified developers including one or more developers included in developer clusters 204B and 204C. Assignment module 116 may provide list of qualified developers 308 on a display, which states "The developers most qualified to complete new task 302 are listed below. Please select a developer or enter another developer for this task assignment." List of qualified developers 308 includes developer2, developer3, developer5, developer6, and developer7. The user may be able to select one of these developers from list of qualified developers 308 or another developer, and have new task 302 assigned to the selected developer. In another example, assignment module 116 sends list of qualified developers 308 to the administrator, without displaying the list on the screen.

It is understood that additional processes may be performed before, during, or after actions 301, 303, 305, and/or 307 discussed above. It is also understood that one or more of the actions of process flow 300 described herein may be omitted, combined, or performed in a different sequence as desired. For example, task classification module 114 may classify new task 302 using techniques discussed in the present disclosure (e.g., action 207 in FIG. 2).

Figure 4:
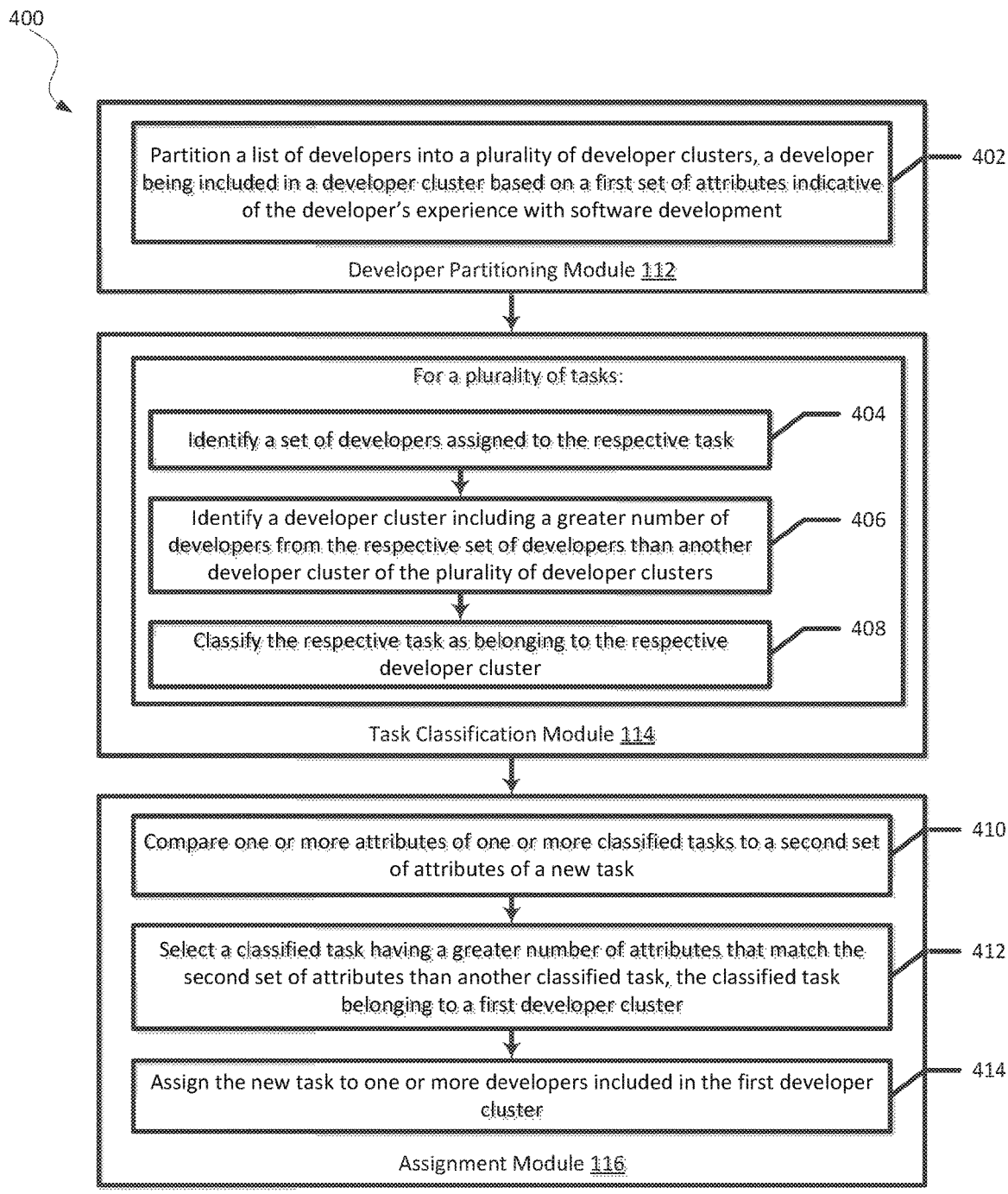
FIG. 4 is a diagram illustrating an example method flow for assigning a new task to a developer.

FIG. 4 is a diagram illustrating an example method flow 400 for assigning a task to a developer. Method 400 is not meant to be limiting and may be used in other applications.

At block 402, developer partitioning module 112 partitions list of developers 202 into plurality of developer clusters 204, a developer being included in a developer cluster based on a first set of attributes indicative of the developer's experience with software development. For a plurality of tasks, blocks 404, 406, and 408 may be executed. At action 404, task classification module 114 identifies a set of developers assigned to the respective task. At action 406, task classification module 114 identifies a developer cluster including a greater number of developers from the respective set of developers than another developer cluster of the plurality of developer clusters. At action 408, task classification module 114 classifies the respective task as belonging to the developer cluster.

At action 410, assignment module 116 compares one or more attributes of one or more classified tasks to a second set of attributes of new task 302. At action 412, assignment module 116 selects a classified task having a greater number of attributes that match the second set of attributes than another classified task, the classified task belonging to a first developer cluster. At action 414, assignment module 116 assigns the new task to one or more developers included in the first developer cluster.

It is understood that additional processes may be performed before, during, or after blocks 402-414 discussed above. It is also understood that one or more of the blocks of method 400 described herein may be omitted, combined, or performed in a different sequence as desired.

Figure 5:
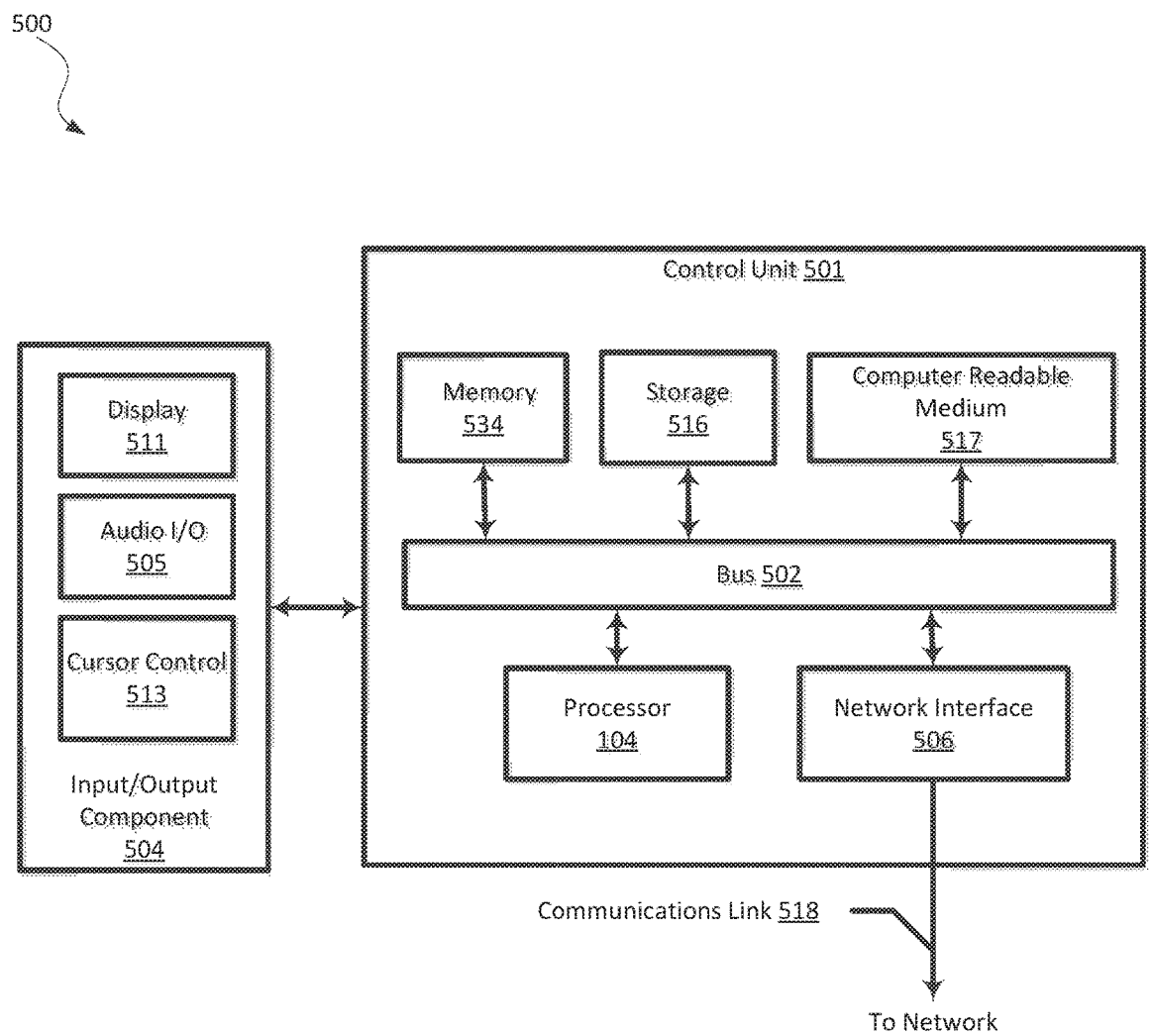
FIG. 5 is a block diagram of an electronic system suitable for implementing one or more examples of the present disclosure.

FIG. 5 is a block diagram of a computer system 500 suitable for implementing one or more examples of the present disclosure. In various implementations, computer system 500 corresponds to computing system 100, which may include a client or a server computing device. The client or server computing device may include a plurality of processors. The client or server computing device may additionally include one or more storage devices each selected from a group including floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 500 includes a bus 502 or other communication mechanism for communicating information data, signals, and information between various components of computer system 500. Additionally, computer system 500 includes an input/output (I/O) component 504 that processes a user action, such as selecting keys from a keypad/keyboard, selecting one or more buttons or links, etc., and sends a corresponding signal to bus 502. In an example, a user may interact with task assignment module 110 using I/O component 504. For example, the user may select a developer for the assignment of new task 302 in FIG. 3. I/O component 504 may also include an output component such as a display 511, and an input control such as a cursor control 513 (such as a keyboard, keypad, mouse, etc.).

A transceiver or network interface 506 transmits and receives signals between computer system 500 and other devices via a communications link 518 to a network. In an example, the transmission is wireless, although other transmission mediums and methods may also be suitable. Processor 104, which may be a micro-controller, digital signal processor (DSP), or other processing component, processes these various signals, such as for display on computer system 500 or transmission to other devices via communications link 518. Processor 104 may also control transmission of information, such as cookies or IP addresses, to other devices.

Components of computer system 500 also include a system memory component 534 (e.g., RAM), a static storage component 516 (e.g., ROM), and/or a computer readable medium 517 (e.g., disk drive). System memory component 534 may include memory 106. Computer system 500 performs specific operations by processor 104 and other components by executing one or more sequences of instructions contained in system memory component 534. Logic may be encoded in a computer readable medium, which may refer to any medium that participates in providing instructions to processor 104 for execution. Such a medium may take many forms, including but not limited to, non-volatile media, volatile media, and transmission media.

In various implementations, non-volatile media includes optical, or magnetic disks, or solid-state drives, volatile media includes dynamic memory, such as system memory component 534, and transmission media includes coaxial cables, copper wire, and fiber optics, including wires that include bus 502. In an example, the logic is encoded in non-transitory computer readable medium. In an example, transmission media may take the form of acoustic or light waves, such as those generated during radio wave, optical, and infrared data communications. Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various examples, execution of instruction sequences (e.g., process flow 200, process flow 300, and/or method flow 400) to practice the present disclosure may be performed by computer system 500. In various other examples, a plurality of computer systems 500 coupled by communication links 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various examples provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various steps, blocks, or actions described herein may be changed, combined into composite steps, blocks, or composite actions, and/or separated into sub-steps, sub-blocks, or sub-actions to provide features described herein.

The foregoing disclosure is not intended to limit the present disclosure to the precise forms or particular fields of use disclosed. As such, it is contemplated that various alternate examples and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A method of assigning a task to a developer, comprising:
    partitioning a list of developers into a plurality of developer clusters, a developer being included in a developer cluster based on a first set of attributes indicative of the developer's experience with software development, and the first set of attributes including at least one of the respective developer's commits, number of commits, or comment on previous commits;
    for a plurality of tasks:
        identifying a set of developers assigned to the respective task;
        identifying a developer cluster including a greater number of developers from the respective set of developers than another developer cluster of the plurality of developer clusters; and
        classifying the respective task as belonging to the respective developer cluster;
    comparing one or more attributes of one or more classified tasks to a second set of attributes of a new task;
    selecting a classified task having a greater number of attributes that match the second set of attributes than another classified task, the classified task belonging to a first developer cluster; and
    assigning the new task to one or more developers included in the first developer cluster.

2. The method of claim 1, further comprising:
    selecting a second classified task having a greater number of attributes that match the second set of attributes than another classified task, the second classified task belonging to a second developer cluster; and
    assigning the new task to one or more developers included in the second developer cluster.

3. The method of claim 1, wherein selecting the classified task includes selecting the classified task having the greatest number of attribute matches to the second set of attributes.

4. The method of claim 1, wherein identifying the developer cluster includes identifying the developer cluster including the greatest number of developers from the respective set of developers compared to each developer cluster of the plurality of developer clusters.

5. The method of claim 1, wherein an attribute of the second set of attributes is a description of the new task, the comparing one or more attributes of one or more classified tasks to the second set of attributes of the new task includes comparing a description of a classified task to the description of the new task for one or more keywords.

6. The method of claim 1, further comprising:
    receiving a request to assign the new task to one or more developers.

7. The method of claim 1, further comprising:
    displaying a list of developers on a screen of a computing device, the list of developers including one or more developers included in the first developer cluster.

8. The method of claim 1, wherein the new task is to fix a software bug.

9. The method of claim 8, wherein the first set of attributes includes at least one of the respective developer's number of comments, years of experience, number of prior assigned tasks, tags of prior tasks or tickets, or description of prior assigned tasks.

10. The method of claim 1, wherein partitioning the list of developers into the plurality of developer clusters includes partitioning the list of developers in accordance with a K-means clustering formula.

11. The method of claim 1, wherein the comparing and the selecting the classified task includes comparing one or more attributes of one or more classified tasks to the second set of attributes of the new task and selecting the classified task in accordance with a K nearest neighbor formula.

12. The method of claim 1, wherein the first set of attributes includes the respective developer's comment of git-commits, and for each developer included in a first developer cluster, a number of matching keywords in the respective developer's comment of git-commits satisfies a threshold.

13. The method of claim 12, wherein the first set of attributes includes the respective developer's number of git-commits, and for each developer included in a second developer cluster, the respective number of git-commits satisfies a second threshold.

14. The method of claim 13, wherein the first set of attributes includes a description of a prior task assigned to the respective developer, and for each developer included in a third developer cluster, a number of matching keywords in the respective prior task satisfies a third threshold.

15. The method of claim 1, wherein the first set of attributes includes a description of a prior task assigned to the respective developer, and for each developer included in a third developer cluster, a number of matching keywords in the respective prior task satisfies a threshold.

16. A system for assigning a task to a developer, comprising:
    a non-transitory memory; and
    one or more hardware processors coupled to the non-transitory memory and configures to read instructions from the non-transitory memory to cause the system to perform operations comprising:

partitioning a list of developers into a plurality of developer clusters, a developer being included in a developer cluster based on a first set of attributes indicative of the developer's experience with software development, and the first set of attributes including at least one of the respective developer's commits, number of commits, or comment on previous commits;

for a plurality of tasks;

identifying a set of developers assigned to the respective task;

identifying a developer cluster including a greater number of developers from the respective set of developers than another developer cluster; and classifying the respective task as belonging to the respective developer cluster; and comparing one or more attributes of one or more classified tasks to a second set of attributes of a new task;

selecting a classified task having a greater number of attributes that match the second set of attributes than another classified task; and assigning the new task to one or more developers included in the first developer cluster, wherein the classified task belongs to the first developer cluster.

17. The system of claim 16, wherein the developer partitioning module partitions the plurality of developers in accordance with a K-means clustering formula.

18. The system of claim 16, the operations further comprising:

selecting the classified task having the greatest number of attribute matches to the second set of attributes in accordance with a K nearest neighbor formula.

19. The system of claim 16, wherein the new task is to fix a software bug.

20. A non-transitory machine-readable medium comprising a plurality of machine-readable instructions that when executed by one or more processors is adapted to cause the one or more processors to perform a method comprising:

partitioning a list of developers into a plurality of developer clusters, a developer being included in a developer cluster based on a first set of attributes indicative of the developer's experience with software development, and the first set of attributes including at least one of the respective developer's commits, number of commits, or comment on previous commits;

for a plurality of tasks:

identifying a set of developers assigned to the respective task;

identifying a developer cluster including a greater number of developers from the respective set of developers than another developer cluster; and classifying the respective task as belonging to the respective developer cluster;

comparing one or more attributes of one or more classified tasks to a second set of attributes of a new task;

selecting a classified task having a greater number of attributes that match the second set of attributes than another classified task, the classified task belonging to a first developer cluster; and assigning the new task to one or more developers included in the first developer cluster.

* * * * *